March 18, 1952     M. M. MORATTA     2,589,274
PISTON RING
Filed Sept. 17, 1947
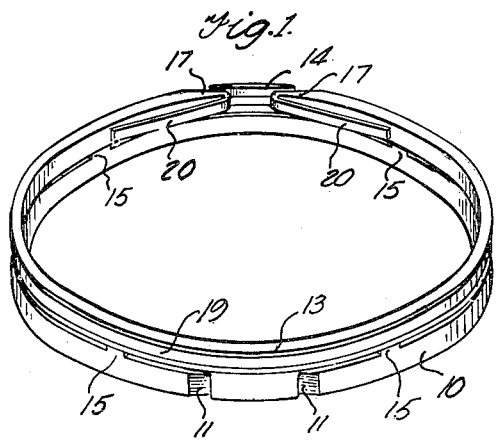
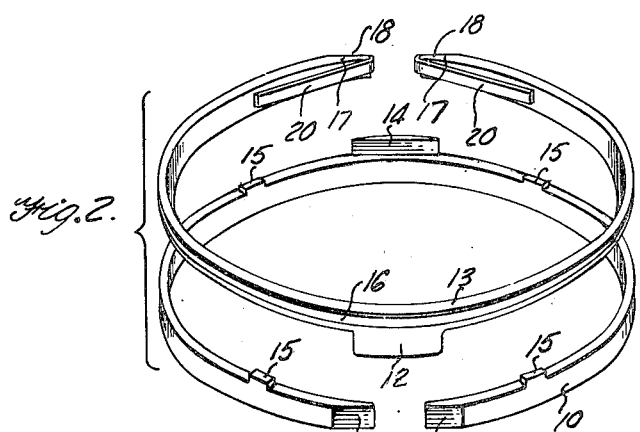
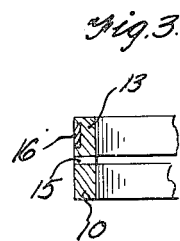
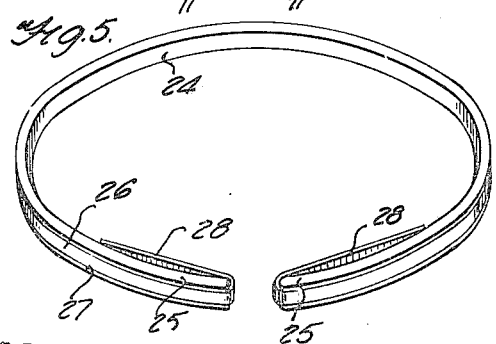
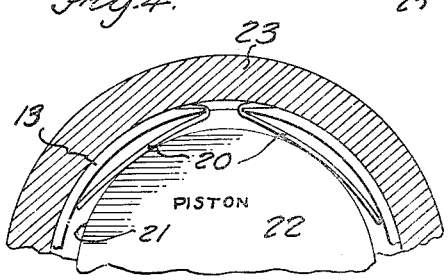
INVENTOR.
MATHEW M. MORATTA
BY
HIS ATTY.

Patented Mar. 18, 1952

2,589,274

UNITED STATES PATENT OFFICE 2,589,274

PISTON RING

Mathew M. Moratta, Princeton, Ind.

Application September 17, 1947, Serial No. 774,642

6 Claims. (Cl. 309—44)

This invention relates to a combination packing and expander piston ring, and has for one of its objects the production of a simple and efficient piston ring wherein the inner ring performs a dual function of a packing ring and an expander ring.

A further object of this invention is the production of a packing and expander piston ring which fits a variety of cylinder bores, thereby avoiding the necessity of providing an exact-size piston ring for each different-sized cylinder bore.

Other objects and advantages of this invention will appear throughout the following specification and claims.

In the drawing:

Figure 1 is a perspective view of the inner and outer rings assembled;

Figure 2 is a group perspective view of the inner and outer rings separated;

Figure 3 is a sectional view taken on line 4—4 of Figure 1;

Figure 4 is a transverse fragmentary sectional view through a cylinder showing the ring in position;

Figure 5 is a perspective view of a modified form of a single ring.

By referring to the drawing, it will be seen that 10 designates the outer ring which is provided with split beveled ends 11 for slidably engaging the depending segmental flange 12 of the inner ring 13. The outer ring 10 is provided with an upstanding segmental flange 14 which is preferably arranged diametrically opposite the flange 12. The outer ring 10 carries lugs 15 upon the upper face thereof for contacting the under face of the ring 13 and to support the body of the ring 13 in slightly spaced relation relative to the ring 10.

The inner ring 13 is provided with a circumferential channel 16 in its outer face which terminates at the spaced ends 17 of the ring 13. These ends are beveled or tapered, as at 18. A spring sheet metal band 19 fits within the channel 16 and this band is provided with backwardly-folded straight end portions or terminals 20. These portions or terminals 20 extend from the spaced ends 17 of the ring 13 to a point inwardly of the ends 17 where they contact the inner face of the ring 13. Since the terminals 20 are straight from end to end, these terminals 20 will span the distance between the ends 17 and their points of end contact with the ring 13, as shown in Figures 2, 3 and 5. The terminals 20 will contact the inner face 21 of the piston 22 in the manner shown in Figure 4. Because of the fact that the ends 20 are straight, and the band 19 is formed of spring metal, the terminals 20 will yieldably adjust the expanding split inner ring 13 and cause the ring 13 to snugly engage the bore of the cylinder 23. Furthermore, the terminals 20 will cause the ring 13 to adjust itself to a variety of sizes of cylinder bores. Consequently, a wide margin of sizes of cylinder bores may be serviced by the type of ring illustrated and described, merely by providing several typical sized rings, which because of the band 19 and terminals 20, will automatically adjust themselves to a snug fit against the wall of the bore. In this way the necessity for providing an exact size of ring for an exact size of bore is avoided.

In Figure 5 there is shown a modified form of the invention, illustrating a single ring structure comprising a split ring 24 having split ends 25. A resilient spring metal band 26 is snugly fitted within the circumferential channel 27 formed in the outer face of the ring 24. The band 26 is provided with backwardly bent straight terminals 28 similar to the terminals 20. These terminals span the distance between the ends 25 and their points of end contact with the inner face of the ring 24. These terminals will tend to expand the ring 24 into snug contact with the wall of the bore of a cylinder by yieldably engaging the piston in the same manner as illustrated in Figure 4 with respect to the ring 13 and terminals 20.

Having described the invention, what is claimed is:

1. A variable adjustable piston ring comprising a substantially circular body having split ends, means carried by said body to automatically move said split ends apart and expand the circumference of said body when the ring is placed upon a piston to force the ring into snug fitting engagement with the wall of a cylinder bore in which the piston and ring are placed, said means comprising a resilient band encircling said body and having inturned terminals overlapping said split ends, said body having a circumferential channel in its outer face, said band fitting snugly in said channel, and the inturned resilient terminals overlying and being spaced away from the inner face of the body for a portion of their lengths.

2. An automatic variable adjustable piston ring of the class described comprising a substantially circular body having spaced split ends, and a resilient expansion band encircling the exterior of said body, said band having inturned straight terminals extending around the spaced ends of the body and inwardly along the inner face of the body, the terminals being spaced from the inner face of the body for a portion of their lengths to provide yieldable piston engaging abutments to automatically expand said body into snug engagement with a cylinder bore in which the ring is placed.

3. An automatic variable adjustable piston ring of the class described comprising a substantially circular body having spaced split ends, a resilient expansion band encircling the exterior of said body, said band having inturned straight terminals extending around the spaced ends of the body and inwardly along the inner face of the body, the terminals being spaced from the inner face of the body for a portion of their lengths to provide yieldable piston engaging abutments to automatically expand said body into snug engagement with a cylinder bore in which the ring is placed, and said spaced ends being tapered on the outer face of the body.

4. An automatic variable adjustable piston ring of the class described comprising a substantially circular body having spaced split ends, a resilient expansion band encircling the exterior of said body, said band having inturned straight terminals extending around the spaced ends of the body and inwardly along the inner face of the body, the terminals being spaced from the inner face of the body for a portion of their lengths to provide yieldable piston engaging abutments to automatically expand said body into snug engagement with a cylinder bore in which the ring is placed, a second ring member supporting said variable adjustable piston ring and having spaced ends and each ring having a flange overlapping the spaced ends of the adjoining ring.

5. An automatic variable adjustable piston ring of the class described comprising a substantially circular body having spaced split ends, a resilient expansion band encircling the exterior of said body, said band having inturned straight terminals extending around the spaced ends of the body and inwardly along the inner face of the body, the terminals being spaced from the inner face of the body for a portion of their lengths to provide yieldable piston engaging abutments to automatically expand said body into snug engagement with a cylinder bore in which the ring is placed, a second ring member supporting said variable adjustable piston ring and having spaced ends, each ring having a flange overlapping the spaced ends of the adjoining ring, the ends of the rings being tapered on the flange contacting faces.

6. An automatic variable adjustable piston ring of the class described comprising a substantially circular body having spaced split ends, a resilient expansion band encircling the exterior of said body, said band having inturned straight terminals extending around the spaced ends of the body and inwardly along the inner face of the body, the terminals being spaced from the inner face of the body for a portion of their lengths to provide yieldable piston engaging abutments to automatically expand said body into snug engagement with a cylinder bore in which the ring is placed, a second ring member supporting said variable adjustable piston ring and having spaced ends, each ring having a flange overlapping the spaced ends of the adjoining ring, and spacing lugs interposed between said rings.

MATHEW M. MORATTA.

REFERENCES CITED

The following references are of record in the file of this patent:

UNITED STATES PATENTS

| Number | Name | Date |
|---|---|---|
| 1,357,949 | Brooks | Nov. 9, 1920 |
| 1,831,574 | Norton | Nov. 10, 1931 |
| 1,987,840 | Newson | Jan. 15, 1935 |
| 2,065,817 | Marien | Dec. 29, 1936 |
| 2,269,763 | Grant | Jan. 13, 1942 |